United States Patent [19]

Lykken et al.

[11] Patent Number: 5,613,404
[45] Date of Patent: Mar. 25, 1997

[54] TILTABLE STEERING MECHANISM FOR AN OFF-HIGHWAY IMPLEMENT

[75] Inventors: Thomas G. Lykken, Fargo; Barry A. Bowman, Harwood; Philip T. Kemper, Fargo, all of N. Dak.

[73] Assignee: Case Corporation, Racine, Wis.

[21] Appl. No.: 207,346

[22] Filed: Mar. 7, 1994

[51] Int. Cl.$^6$ ............................................. B62D 1/18
[52] U.S. Cl. ............................ 74/493; 74/531; 280/775
[58] Field of Search ................... 74/493, 531; 280/775; 267/64.12, 64.28, 124

[56] References Cited

U.S. PATENT DOCUMENTS

| | | | |
|---|---|---|---|
| 2,865,222 | 12/1958 | Bachman | 74/493 |
| 2,937,881 | 5/1960 | Norrie | 280/87 |
| 3,302,478 | 2/1967 | Pauwels | 74/493 |
| 3,309,103 | 3/1967 | Newbury | 280/87 |
| 3,504,569 | 4/1970 | Zoltok | 74/493 |
| 3,548,675 | 12/1970 | Crimes et al. | 74/493 |
| 3,628,396 | 12/1971 | Grobowski | 74/493 |
| 3,718,053 | 2/1973 | Cinadr | 74/493 |
| 3,868,896 | 3/1975 | Doll et al. | 98/2.11 |
| 4,041,796 | 8/1977 | Shishido | 74/493 |
| 4,072,487 | 2/1978 | Irwin | 62/244 |
| 4,221,274 | 9/1980 | Martin, Jr. | 180/69 R |
| 4,240,305 | 12/1980 | Denaldi et al. | 74/493 |
| 4,365,541 | 12/1982 | Marques et al. | 98/2.11 |
| 4,392,670 | 7/1983 | Schultz | 280/775 |
| 4,449,419 | 5/1984 | Soler Bruguera | 74/493 |
| 4,518,195 | 5/1985 | Tindall et al. | 296/148 |
| 4,527,444 | 7/1985 | McKee et al. | 74/493 |
| 4,531,453 | 7/1985 | Warman et al. | 98/2.11 |
| 4,580,647 | 4/1986 | Peifer et al. | 180/78 X |
| 4,612,975 | 9/1986 | Ikari | 165/43 |
| 4,656,888 | 4/1987 | Schmitz | 74/493 |
| 4,709,592 | 12/1987 | Andersson | 74/493 |
| 4,774,851 | 10/1988 | Iwanami et al. | 74/493 |
| 4,900,059 | 2/1990 | Kinoshita et al. | 280/775 |
| 4,915,412 | 4/1990 | Yuzuriha et al. | 280/775 |
| 4,972,732 | 11/1990 | Venable et al. | 74/493 |
| 4,993,279 | 2/1991 | Doescher et al. | 74/493 |
| 5,035,446 | 7/1991 | Arvidsson | 280/775 |
| 5,088,767 | 2/1992 | Hoblingre et al. | 280/775 |
| 5,105,677 | 4/1992 | Hoblingre et al. | 74/493 |
| 5,168,768 | 12/1992 | Easton | 74/493 |
| 5,178,411 | 1/1993 | Fevre et al. | 280/775 |
| 5,259,264 | 11/1993 | Bodin et al. | 74/493 |
| 5,265,492 | 11/1993 | Snell | 74/493 |
| 5,346,255 | 9/1994 | Schafer et al. | 280/775 |
| 5,363,716 | 11/1994 | Budzik, Jr. et al. | 74/493 |
| 5,439,252 | 8/1995 | Oxley et al. | 280/775 |

FOREIGN PATENT DOCUMENTS

| | | | |
|---|---|---|---|
| 45230 | 2/1982 | European Pat. Off. | 74/493 |
| 20258471 | 10/1990 | Japan . | |
| 1079160 | 8/1967 | United Kingdom | 74/493 |
| 2092081 | 8/1982 | United Kingdom | 74/493 |
| 9106461 | 5/1991 | WIPO | 74/531 |

OTHER PUBLICATIONS

Sperry New Holland Service parts Catalog (Nov., 1993).

Primary Examiner—Charles A. Marmor
Assistant Examiner—Troy Grabow
Attorney, Agent, or Firm—Rudnick & Wolfe

[57] ABSTRACT

A tiltable steering system for an off-highway implement including a steering column having a steering wheel connected toward an upper end thereof. A tilting mechanism for the steering column defines a generally horizontal pivot about which the steering column moves. The tilting mechanism further includes a gas spring mechanism connected to the steering column for allowing the steering column to pivotally move through a relatively wide range of positions and thereafter be locked in a selected tilted position. A second tilting mechanism is provided between the steering column and the steering wheel for allowing the steering wheel to be adjusted and secured in a tilted position independently of the selected tilted position of the steering column. To further promote ergonomic positioning of the steering wheel, the steering column of the present invention is elevationally adjustable as through telescoping casings which define the steering column. A locking mechanism secures the casings in adjusted relation to each other thereby allowing the elevational position of the steering wheel to be adjusted as desired by the operator.

23 Claims, 10 Drawing Sheets

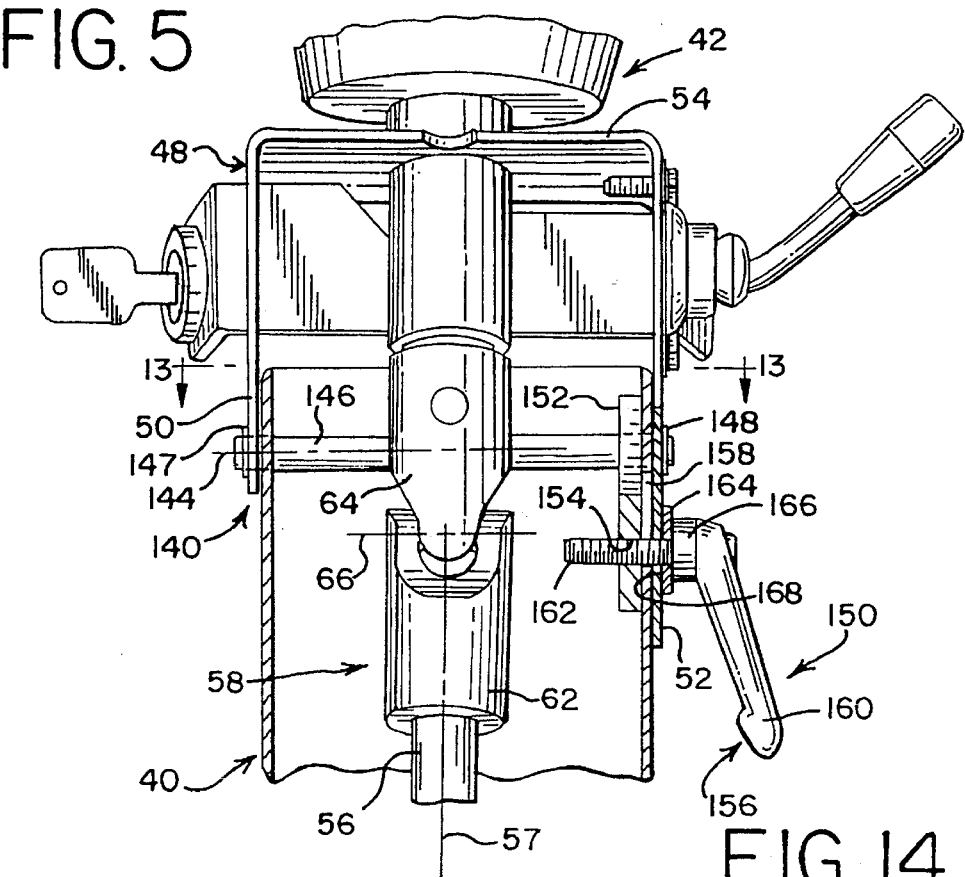
FIG. 5
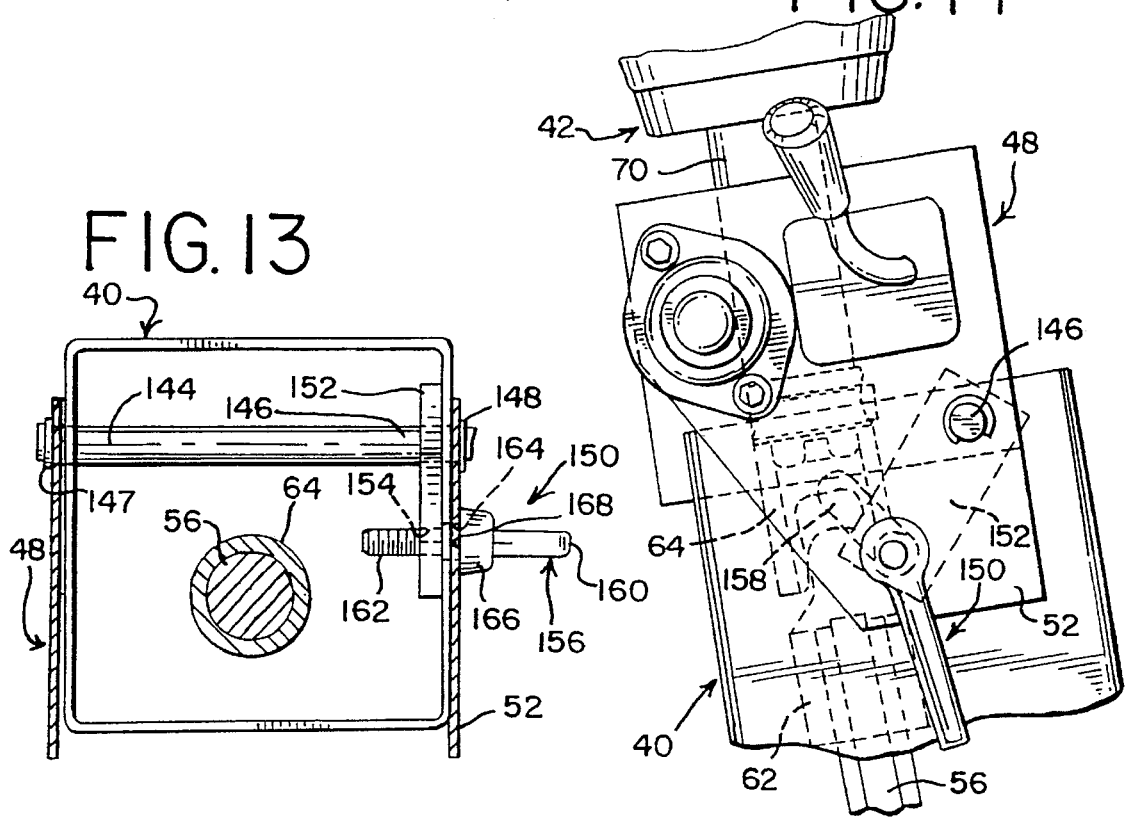
FIG. 13
FIG. 14

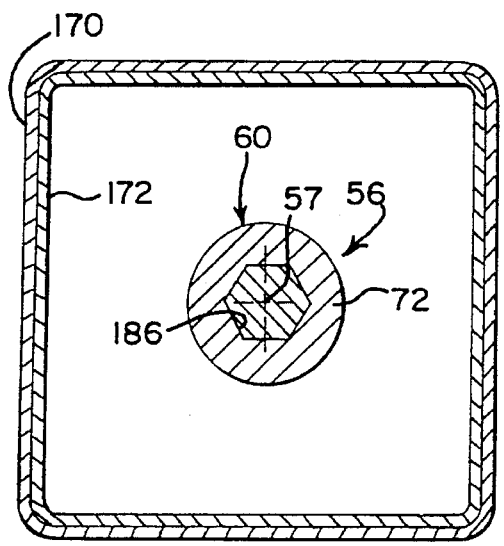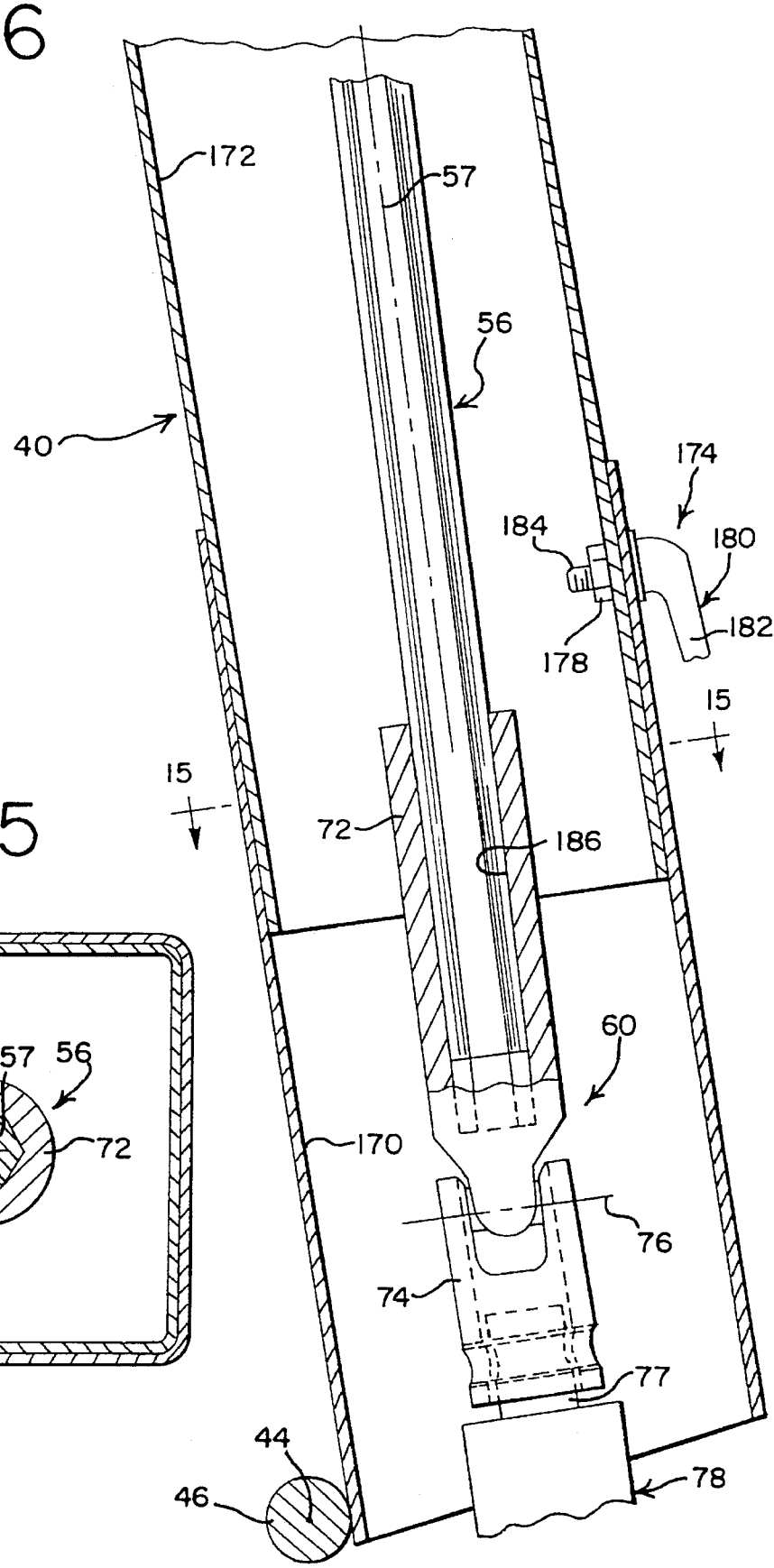

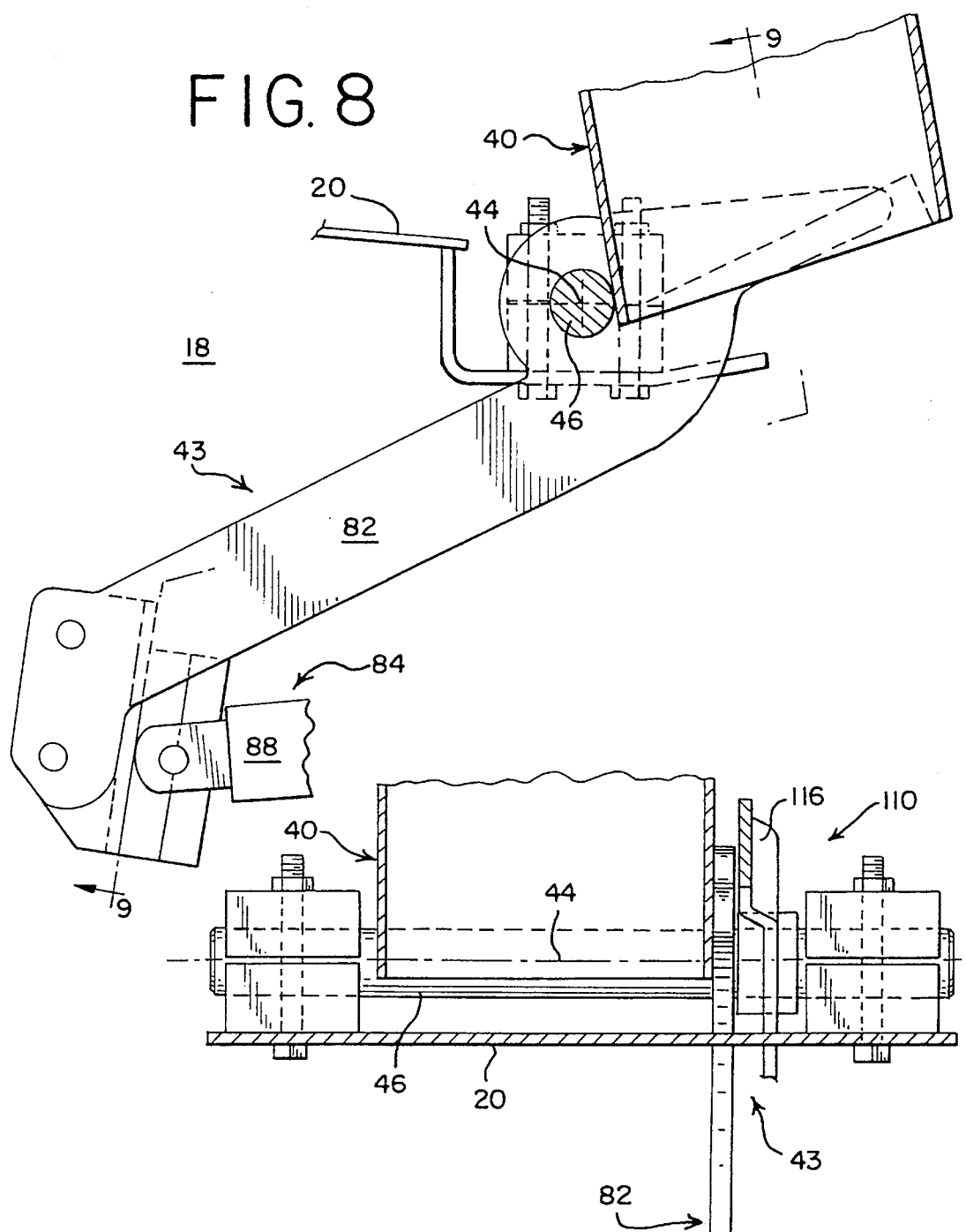

TILTABLE STEERING MECHANISM FOR AN OFF-HIGHWAY IMPLEMENT

FIELD OF THE INVENTION

The present invention generally relates to a steering system for off-highway implements and, more particularly, to an off-highway implement steering system including a vertically tiltable steering column that enhances visibility from a cab region of the implement and facilitates access and egress from the cab region of the implement.

BACKGROUND OF THE INVENTION

The operation of off-highway implements such as combines and cotton harvesters under adverse environmental conditions requires protecting the operator from dust and noise. Continuing concerns for operator comfort has lead to the development of increasingly sophisticated operator enclosures which are generally referred to as cabs. A cab region of an implement is, of course, provided with the essential control mechanisms for effecting operation of the implement.

The cab region of an off-highway implement generally includes a steering mechanism for providing direction to the implement, an operator seat arranged rearwardly of the steering mechanism for allowing the operator to be comfortably seated while the implement is driven through the field, and a myriad of control mechanisms ergonomically arranged about the seat to facilitate control over both the implement and the various ancillary mechanisms associated with the implement while allowing the operator to remain comfortably seated.

A typical operator enclosure on a combine or cotton harvester substantially encloses the implement controls and includes a floor, a pair of windowed side walls or panels, at least one of which is provided with a door to provide operator access and egress to and from the cab region, a rear wall, a front wall, and a roof. The front wall of a typical combine or cotton harvester includes a vertical window arranged in front of the steering mechanism and typically spanning the distance between the floor and the roof and between the side panels.

As is known in the art, ancillary mechanisms such as a header assembly or a series of side-by-side cotton picker/ stripper units are mounted directly below and extend forwardly from the front window of combines and cotton harvesters. To evaluate continuing performance and operation, the operator is desirous of visually accessing operation of the header assembly or cotton picker/stripper units as the implement is driven across the field. From the operator seat, however, the operator does not have visual access directly beneath the front window. It is common, therefore, for the operator to raise up from the seat to look beneath the front window.

While development efforts continue on providing a cab region with improved ergonomic conditions, space constraints are and continue to be a serious problem. It has been well known in the art of off-highway implements to provide a steering mechanism that includes a steering column that vertically moves or tilts from one position to another. The steering column has a steering wheel attached toward an upper end thereof. By such construction the steering wheel can be moved away from the front window and toward the operator seat such that steering movements for the implement can be effected while the operator remains comfortably seated. When the operator desires to view beneath the front window, the steering column is tilted toward the front window thereby allowing the operator to raise from the seat to visually access operations of the ancillary mechanisms directly beneath the front window A variety of different arrangements have been developed that allow the steering column to pivot. Different positions along a steering column, e.g. the base or the midpoint, have been used as a pivot point. These arrangements, however, require complex pivoting mechanisms that do not necessarily provide for an adequate amount of tilt to achieve optimal visibility. There is also available a steering column to pivot in conjunction with the control panel of the off-highway implement. This steering column system, however, is limited by its size, and its bulk makes the arrangement cumbersome.

A variety of methods have also been developed to effectuate the tilting of the steering column relative to the off-highway implement. A tooth and gear arrangement and a clamp arrangement are but a few of these many methods available. These arrangements serve their purpose but tend to limit the potential range of motion of a tilting steering column.

The arrangements presently provided do not necessarily provide the necessary strength and rigidly to ensure that the steering column remains in a selected position when subjected to the stress often present in various situations and over an extended period of time. As an example, it is common for the operator to grasp the steering wheel and pull thereon when raising from the operator seat. Of course, if the steering column disengages or moves in response to such stress or force, the operator can become frustrated because such movements of the steering column require readjustment of the steering mechanism.

Many of the former steering mechanism arrangements are limited in their range of motion because of their construction. That is, a steering shaft typically extends lengthwise through the steering column. In order for a steering column to vertically pivot or tilt properly, the steering shaft must likewise vertically tilt or pivot. Accordingly, universal joints are provided along the length of the steering shaft. In the past, the universal joints were typically located along the length of the steering shaft corresponding to that pivot point for the steering column. Because of the position of the universal joints along the length of the steering shaft, the tiltable range of motion of the steering column is somewhat limited.

Thus, there is a need and a desire for a steering mechanism for an off-highway mechanism including a tiltable steering column that enhances visibility from the cab region of the off-highway implement as well as facilitates access and egress from the enclosure on the implement.

SUMMARY OF THE INVENTION

In view of the above, and in accordance with the present invention, there is provided a tiltable steering system for an off-highway implement. The steering system of the present invention includes a steering column having a generally horizontal pivot about which the steering column vertically moves to a selected tilted position. The steering column has a steering wheel connected toward an upper end thereof. A tilting mechanism including a gas spring mechanism is attached toward an opposite end of the steering column for allowing the steering column to be infinitely adjusted through a relatively wide range of positions and thereafter to releasably hold the steering column in a selected tilted position.

The steering system of the present invention is particularly useful in connection with an off-highway implement such as a cotton harvester or combine which includes a cab enclosure. The cab enclosure is provided with a floor with a plurality of vertical panels extending between the floor and a roof of the enclosure. One of the vertical panels is a front window which preferably extends between the floor and the roof to enhance visibility in all directions. When arranged in combination with a cab enclosure, the steering column vertically extends upwardly from the floor and is infinitely movable through a relatively wide range of vertical positions toward and away from the front window such that the steering wheel can be ergonomically positioned relative to an operator seat arranged within the enclosure. The ability of the steering column to move through a wide range of positions allows the column to be moved close enough to the operator so that the operator is able to see out of the cab through the entire height of the window and particularly through the bottom of the window to view operation of the ancillary mechanisms without having to rise from the seat.

The tilting mechanism of the steering system preferably includes an arm which extends from a lower end of the steering column and transversely relative to the pivot axis for the steering column. One end of the gas spring mechanism is articulately connected toward the distal or free end of the arm while the opposite end is articulately connected to a main mounting bracket extending from the floor of the cab. The gas spring mechanism includes an extendable and retractable cylinder whose operative length controls the angular or tilted position of the steering column. As will be appreciated, the purpose of the gas spring mechanism cylinder is to releasably lock the steering column against movement in either direction once a selected tilted position has been chosen by the operator.

The operative length of the gas spring mechanism cylinder and thus the tilted position of the steering column can be readily changed or adjusted as through a release mechanism including an operator controlled assembly arranged proximate to the steering column. When a change in the angular orientation of the steering column is to be effected, the operator controlled assembly is used to readily release the gas spring mechanism and allow the operative length of the cylinder to be adjusted thereby effecting a change in the tilted position of the steering column about its pivot axis. The cylinder of the gas spring mechanism is provided with a release valve. The release valve on the cylinder is controlled in response to actuation of the operator controlled assembly. After the operator controlled assembly is released, the cylinder of the gas spring mechanism again acts as a rigid link to rigidly hold the steering column in the selected tilted position until another change is effected by the operator.

In a preferred form, the steering system of the present invention includes a second tilting mechanism arranged between the steering column and the steering wheel. The second tilting mechanism defines a second generally horizontal pivot that extends generally parallel to the pivot axis for the steering column and allows the steering wheel to be separately tilted relative to the selected tilted position of the steering column to any position selected by the operator. The second tilting mechanism further includes a manual lock mechanism for locking the steering wheel in a selected tilted orientation relative to the steering column.

With the present invention, the steering column of the steering system includes a steering shaft which is connected to and rotates in response to turning movements of the steering wheel. The steering shaft is provided with a universal joint arranged along the length of the steering shaft proximate to the pivot which allows the steering column to be vertically moved toward and way from the front window. In a most preferred form of the invention, the steering shaft is provided with another universal joint arranged along the length of the steering shaft proximate to the pivot that allows the steering wheel to be tilted relative to the steering column.

To further enhance the ergonomic considerations and to still further promote visibility from the front window of the cab, a preferred form of the invention permits the height of the steering column to be adjusted as required by the operator. In this regard, the steering column is comprised of at least two casings or sections that are telescopically arranged relative to each other to provide strength and rigidity to the steering column. A suitable locking mechanism allows the sections of the steering column to be secured in a selected vertical relationship relative to each other. Moreover, the steering shaft arranged within the steering column is likewise provided with telescopic sections to accommodate the changes in height of the steering column.

The gas spring mechanism of the tilting mechanism facilitates adjustment of the steering column through a wide range of vertical positions to ergonomically adjust the position of the steering wheel relative to the operator's seat while allowing the steering column to be secured in place during operation of the implement. When desired, the gas spring mechanism of the tilting mechanism can be readily released through the release mechanism thereby allowing the steering column to be moved toward the operator thereby facilitating viewing access out the bottom of the window. To furthermore enhance the ergonomics of the steering system while conjointly enhancing visibility, the steering wheel can be tilted relative to the selected and tilted position of the steering column. A further advantage of the present invention relates to the ability to vertically adjust the height of the steering column and thereby the vertical position of the steering wheel. All of these advantages are set forth in an economic, sturdy structure according to the present invention which is readily susceptible to adjustment.

These and numerous other objects, aims, and advantages of the present invention will become readily apparent from the following detailed description, appended claims, and the accompanying drawings.

BRIEF DESCRIPTION OF THE DRAWINGS

FIG. 5 is an enlarged view, partially shown in section, of an upper end of the steering system of the present invention;

FIG. 6 is an enlarged view, partially shown in section, of a lower end of the steering system of the present invention;

FIG. 8 is another enlarged side elevational view, partially shown in section, of a lower end of the steering system;

FIG. 9 is a sectional view taken along line 9—9 of FIG. 8;

FIG. 13 is a sectional view taken along line 13—13 of FIG. 5;

FIG. 14 is a fragmentary side elevational view of an upper end of the steering system of the present invention;

FIG. 15 is a sectional view taken along line 15—15 of FIG. 6;

DETAILED DESCRIPTION OF THE PRESENT INVENTION

Figure 1:
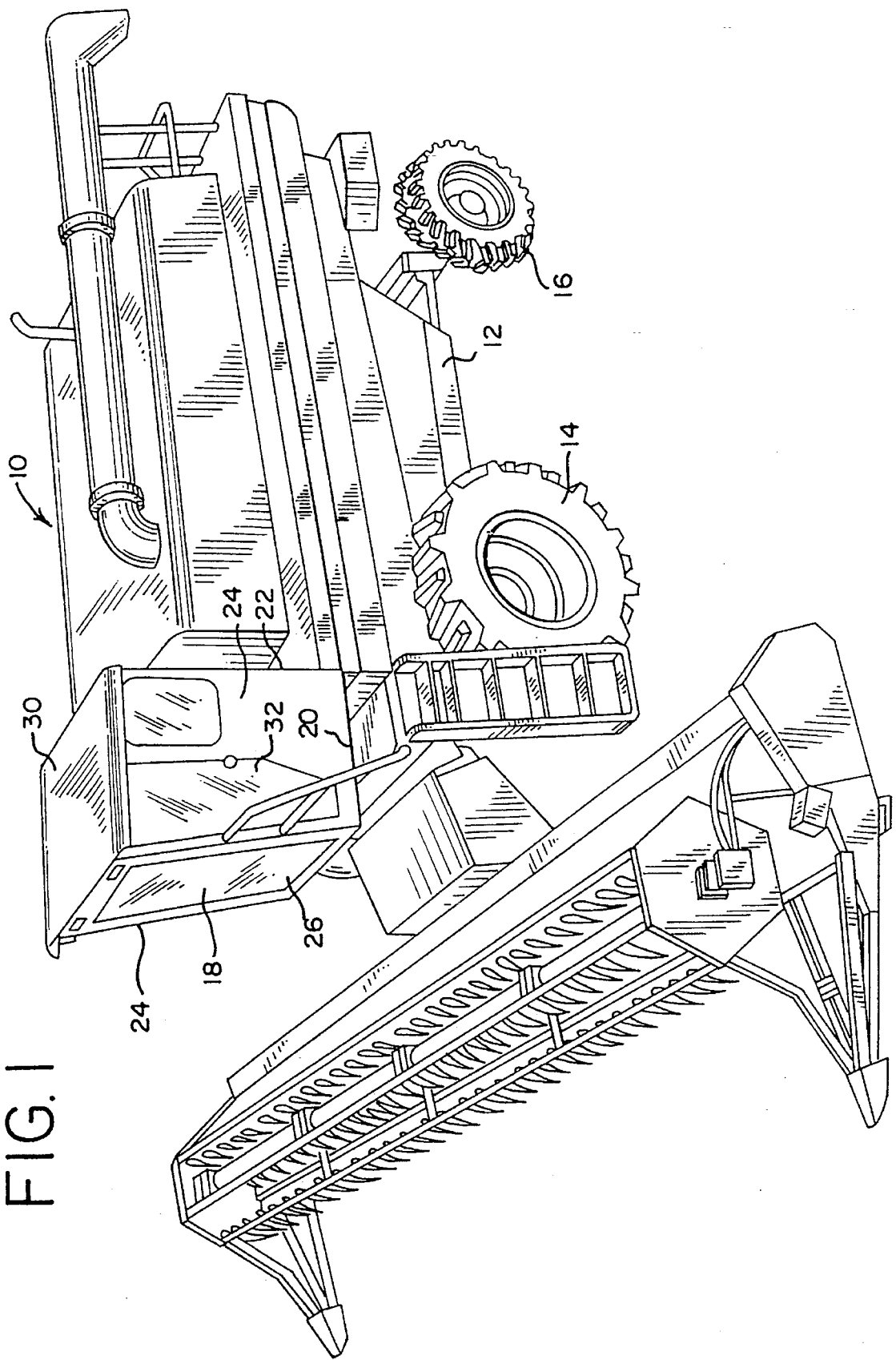
FIG. 1 is a perspective view of an agricultural implement to which a steering system according to the present invention is applied.

While the present invention is susceptible of embodiment in various forms, there is shown in the drawings and will hereinafter be described a preferred embodiment of the invention with the understanding that the present disclosure is to be considered as setting forth an exemplification of the invention which is not intended to limit the invention to the specific embodiment illustrated.

Figure 2:
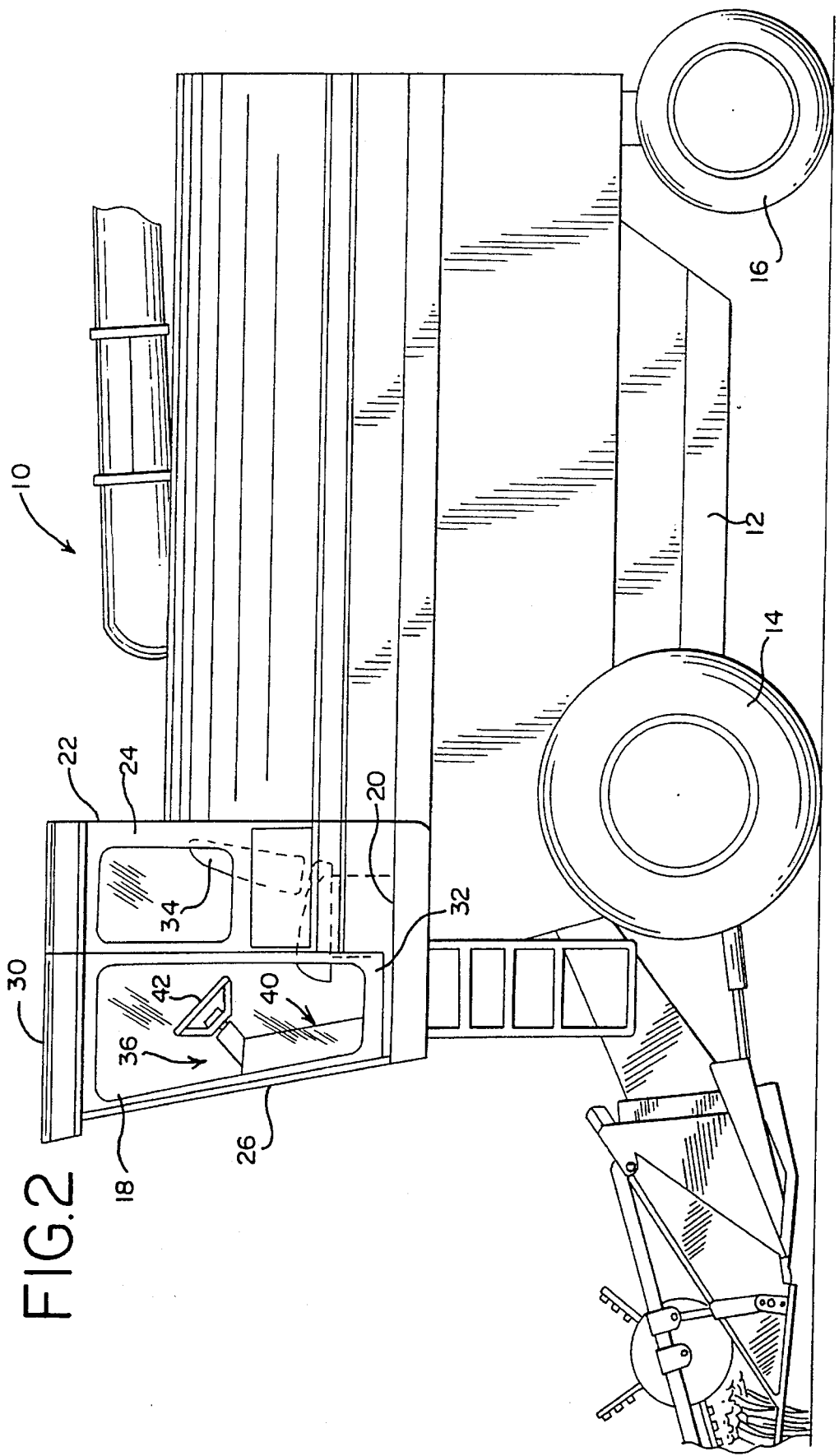
FIG. 2 is a side elevational view of the agricultural implement.

Referring now to the drawings, wherein like reference numerals indicate like parts throughout the several views, there is shown in FIGS. 1 and 2 an off-highway implement 10. Implement 10 is schematically shown as an agricultural combine and preferably a 1600 Series combine like that sold by Case Corporation of Racine, Wis. Alternatively, the implement 10 could be an 1800 Series cotton harvester like that sold by Case Corporation of Racine, Wis. Suffice it to say, the implement 10 includes a mobile frame 12 with ancillary mechanisms connected toward a front end thereof. In the case of a combine, the ancillary mechanism may take the form of a conventional header and feeder assembly combination. Whereas, when the off-highway implement takes the form of a cotton harvester, the ancillary mechanism will likely include a cotton harvesting assembly comprised of a series of cotton picker/stripper units mounted in side-by-side relation relative to each other across the front end of the frame 12.

In either form, the frame 12 of the implement is supported for movement across the field by a pair of front drive wheels 14 and a pair of rear steering wheels 16. An enclosure 18 defining an operator station for the implement is mounted at the forward end of the frame 12 above the ancillary mechanisms. The enclosure 18 is generally rectangular in shape and includes a floor 20, rear wall 22, opposite side walls 24, a front wall 26, and a roof 30. In the illustrated embodiment, and to enable visual access to the ancillary mechanisms disposed therebeneath, the front wall 26 of the enclosure is a window that extends substantially the entire length between the floor 20 and the roof 30 and spans the lateral distance between the side walls 24. To provide access and egress from the enclosure 18, at least one of the side walls is provided with a door 32.

The operator station 18 further includes a seat 34 (FIG. 2) disposed rearwardly of the front window 26. As is conventional, a myriad of controls and equipment are ergonomically arranged about the seat 34 to allow the operator to control the implement and the ancillary mechanisms thereof while remaining comfortably seated. According to the present invention, a tiltable steering system 36 is also provided in the operator station 18 between the front window 26 and the operator seat 34 for providing steering direction to the steering wheels 16 on the implement.

Figure 3:
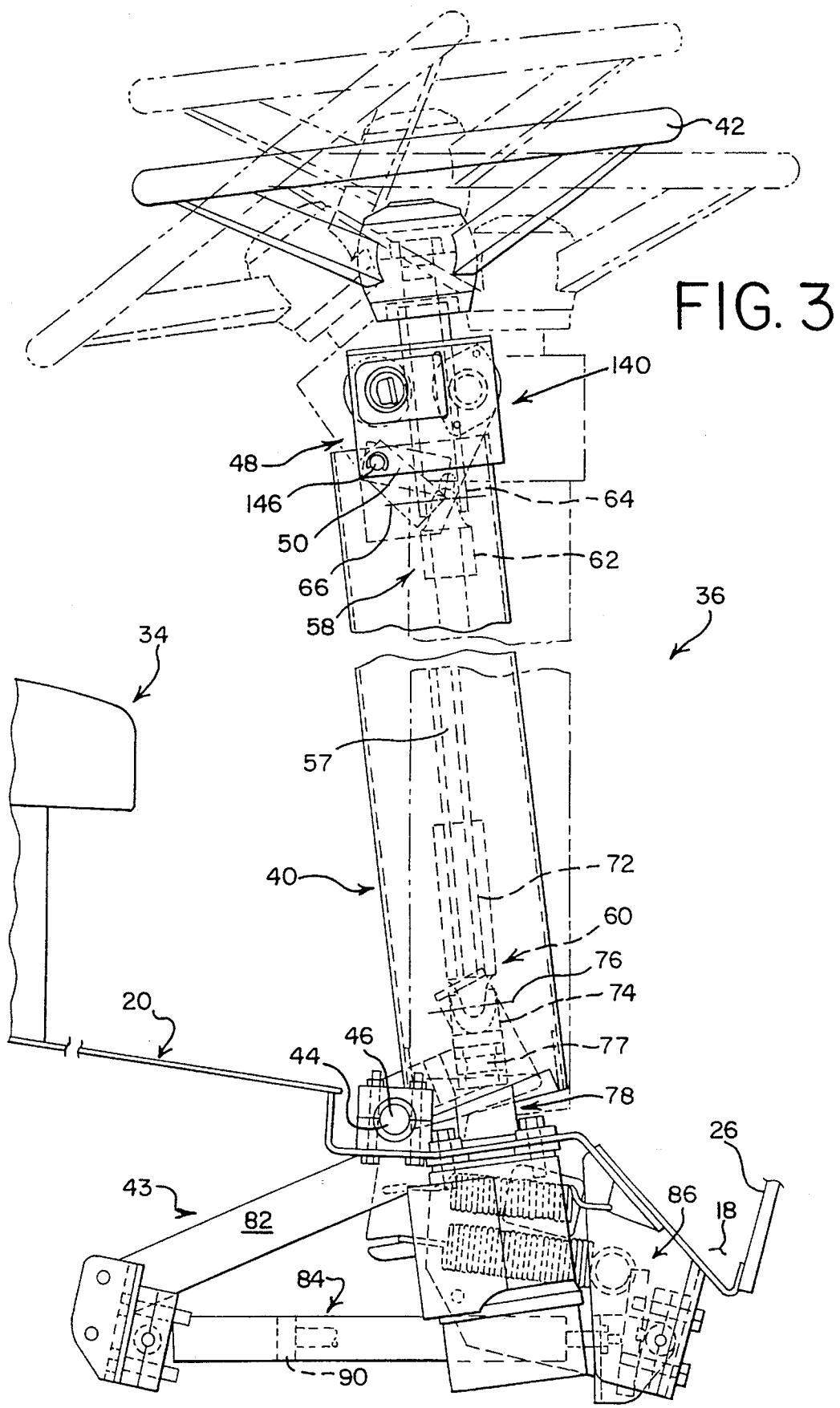
FIG. 3 is a side elevational view of one form of a steering system according to the present invention arranged within a driving compartment of the implement shown in FIGS. 1 and 2.
Figure 4:
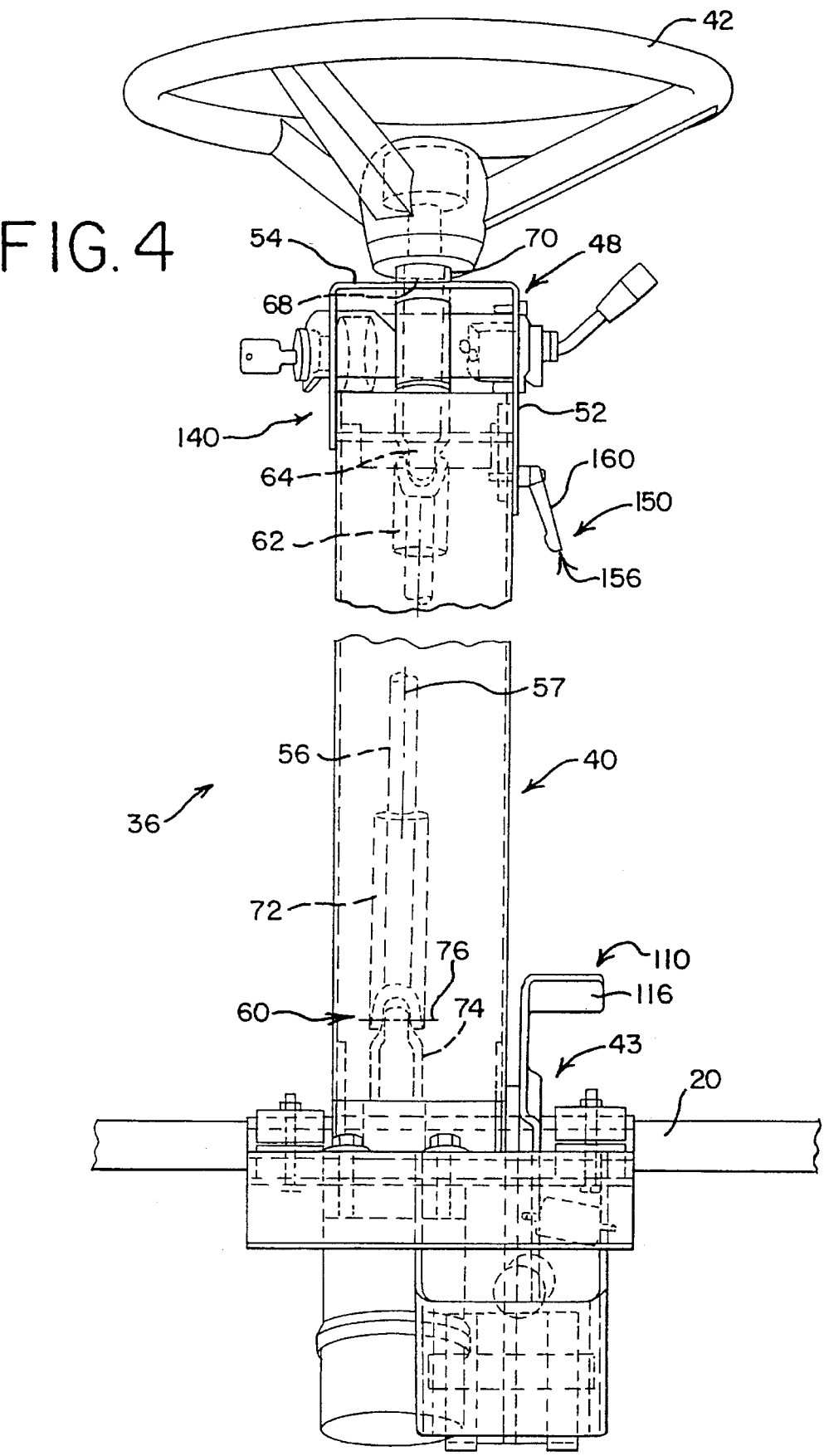
FIG. 4 is a front elevational view of the steering system illustrated in FIG. 3.

As shown in FIGS. 3 and 4, the tiltable steering system 36 of the present invention includes a vertically elongated and hollow steering column 40 that is open at opposite ends and extends upwardly from the floor 20 of the enclosure 18 proximate to the front window 26 and in front of the operator seat 34 and has a conventional steering wheel 42 attached to an upper end thereof. The steering column 40 is mounted in the cab region 18 by and includes a tilting mechanism 43 (FIG. 3).

The purpose of the tilting mechanism 43 is to releasably hold the steering column 40 in a selected vertical tilted position chosen by the operator. To effect such ends, and as shown in FIG. 3, the tilting mechanism 43 allows for pivotal movement of the steering column 40 toward and away from the window 26 about a generally horizontal pivot axis 44 defined by a fixed rockshaft 46 preferably connected toward a lower end of the steering column 40 and which prevents sideways movement of the steering column 40 in a direction normal to the pivotal path of movement of column 40. As will be appreciated, the provision of the tilting mechanism 43 allows column 40 to be moved through and releasably secured in any of a wide range of positions. The tilting mechanism 43 allows the steering column 40 to be tilted forwardly toward the window 26 to promote ingress and egress into and from the cab region of the implement and allows the operator to raise from the seat 34 to view operations of the ancillary mechanisms arranged below and forwardly of the cab region 18 if the need arises. The tilting mechanism 43 likewise allows tilting of the steering column 40 away from the window 26 to promote ergonomic positioning of the steering wheel 42 when the operator is seated and to improve operator visibility through the bottom of the window 26 such that the operator need not necessarily rise from the seat 34 to view operation of the ancillary mechanisms.

At its upper end, and as shown in FIGS. 3 and 4, the steering column 40 carries an inverted generally U-shaped bracket 48. As shown in FIG. 5, one leg 50 of bracket 48 extends closely adjacent and generally parallels one side of the steering column 40 while a second leg 52 of bracket 48 extends closely adjacent and parallels an opposite side of the steering column 40. Legs 50, 52 of bracket 48 are rigidly joined to each other by a top leg or wall 54 that extends across the open top end of the steering column 40.

The steering column 40 of the present invention further includes a vertically elongated steering shaft 56 which extends within and along the length of column 40 for rotation about an axis 57 which is preferably fixed relative to the steering column 40. For purposes to be described below, steering shaft 56 is preferably provided with an upper steering joint 58 (FIG. 5) defining an upper end of the steering shaft 56 and a lower steering joint 60 (FIG. 6) defining a lower end of the steering shaft 56.

As shown in FIG. 5, the upper steering joint 58 is a conventional two-piece universal coupling including lower and upper coupling pieces 62 and 64, respectively, which are articulately connected to each other about an axis 66. The coupling pieces 62, 64 are configured to transmit rotary motion therebetween notwithstanding the angular disposition of the pieces 62, 64 relative to each other. The lower coupling piece 62 of the upper steering coupling or joint 60 is fixedly connected to the steering shaft 56. The upper coupling piece 64 of the upper steering joint 58 is fixed to a lower end of a vertical stub shaft 68 (FIG. 4) that is journalled for rotation within a bushing or bearing 70 carried by the top leg or wall 54 of the bracket 48. The opposite end of the stub shaft 68 extends through to an opposite side of the top wall 54 of the bracket 48 and is fixed for rotation with the steering wheel 42. Accordingly, when a turning motion is imparted to the steering wheel 42, rotary motion is transmitted through the stub shaft 68 to the upper steering joint 58 and, ultimately, to the steering shaft 56.

As shown in FIG. 6, the lower steering joint 60 is likewise a conventional two-piece universal coupling including upper and lower coupling pieces 72 and 74, respectively. The two coupling pieces 72, 74 are articulately connected to each other about an axis 76 and are configured to transmit rotary motion therebetween notwithstanding the angular disposition of the pieces 72, 74 relative to each other.

The upper coupling piece 72 of steering joint 60 is connected to the steering column 56. The lower coupling piece 74 of steering joint 60 is connected to a vertical shaft 77 forming part of a conventional hydraulic steering hand pump mechanism 78 fixedly mounted on the frame of the implement beneath the floor 20 (FIG. 3). The hand pump mechanism 78 is conventionally connected to provide steering movement to the steering wheels 16 (FIGS. 1 and 2) on the implement 10. Notably, the coupling pieces 72, 74 are articulately coupled about axis 76 which is vertically arranged proximate to the pivot axis 44 of the steering column 40. Accordingly, when column 40 is tilted about axis 44, the pieces 72, 74 of steering joint 60 articulately move relative to each other thereby inhibiting binding forces from interfering with the transfer of rotary motion of the steering shaft 56 through the lower steering coupling 60 to the hydraulic steering drive mechanism 78 such that the steering wheels 16 on the implement 10 move in a corresponding direction to the turning action of the wheel 42 to turn the implement in a typical fashion.

Figure 7:
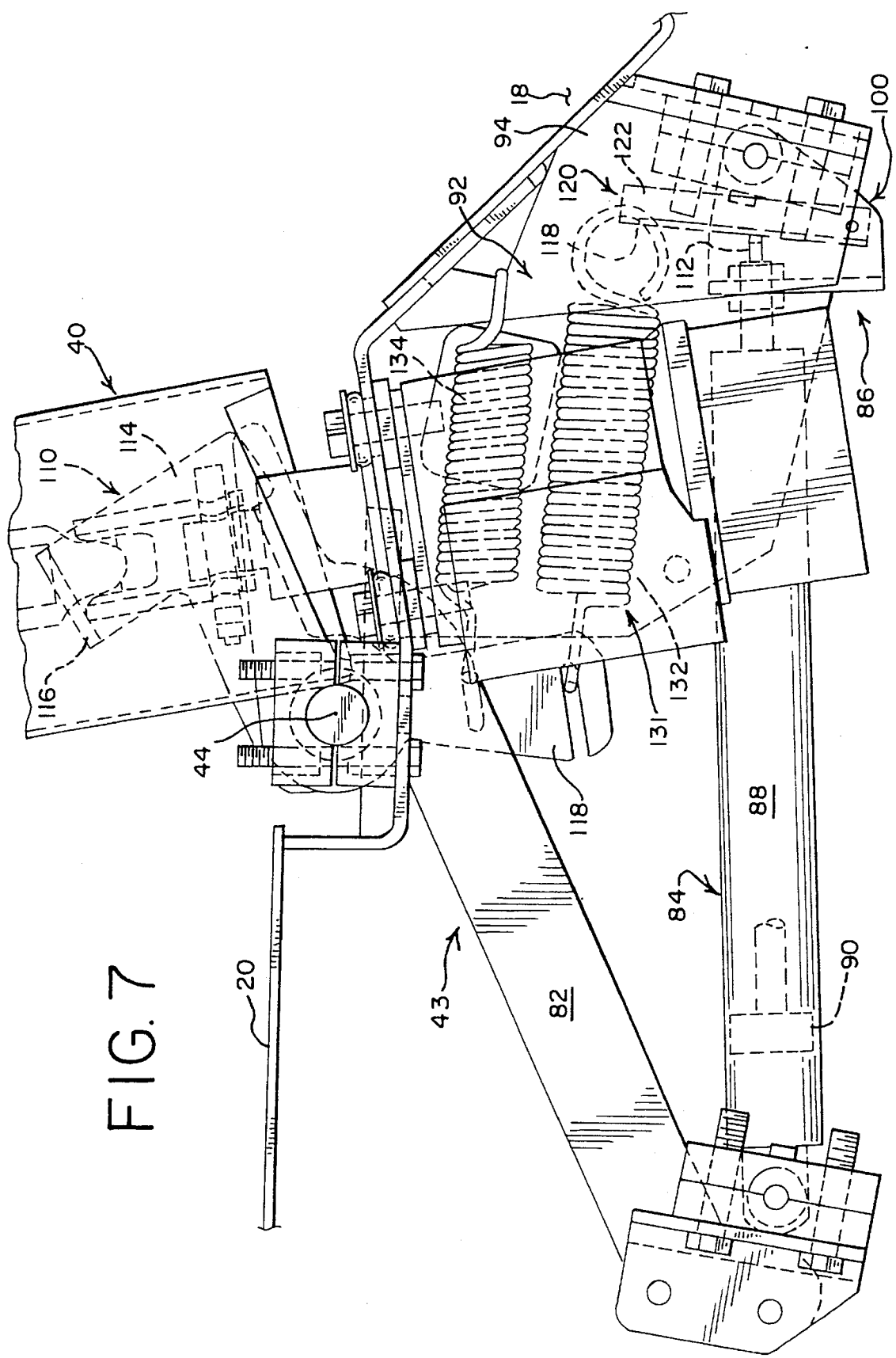
FIG. 7 is an enlarged side elevational view of the lower end of the steering system.

The tilting mechanism 43 releasably locks the steering column 40 in a selected position after allowing the steering column 40 to be tilted about the pivot axis 44. As shown in FIGS. 7, 8 and 9, the tilting mechanism 43 includes a cantilevered arm 82 that moves with and extends radially away from the steering column 40 in a direction extending transverse to the pivot axis 44 of the steering column 40.

In the illustrated embodiment, one end of arm 82 is fixedly connected to the steering column 40 above the floor 20. As shown, the free end of arm 82 is disposed beneath floor 20 of the cab region 18. Albeit movable in response to tilting movements of the steering column 40, that portion of arm 82 disposed beneath the floor 20 does not pass through to above the floor 20 for the full range of motion of the steering column 40. In the illustrated embodiment, a portion of arm 82 intermediate its ends passes through an opening (not shown) in the floor 20. Notably, that portion of arm 82 that passes through the floor 20 is arranged proximate to the axis 44 of rotation of the steering column 40. Therefore, suitable and preferably foam seals (not shown) are provided to wipe against that relatively small area where the arm 82 passes through the floor 20 to prevent dust, dirt, and other contaminates from entering the cab region 18. The free end of arm 82 is articulately connected to a gas spring mechanism 84.

The gas spring mechanism 84 is of the type manufactured and sold by Stabilus of Colmar, Penn. under their Part No. 682802. Suffice it to say, mechanism 84 is configured as a linearly distendable and retractable cylinder 88 with a piston 90 (FIG. 7) endwise slidably movable therewithin. As shown, the cylinder end of cylinder 88 is articulately connected to the distal end of arm 82. The rod end of cylinder 88 extends from piston 90 and is articulately connected to a mounting bracket assembly 86 that depends from and is rigidly secured to the underside of the floor 20. As will be appreciated, the operative length of cylinder 88 controls the movement of arm 82 and thereby controls pivotal movements of the steering column 40 about axis 44.

The cylinder 88 of the gas spring mechanism 84 is preferably purchased with a self contained charge of high pressure gas. It should be noted, however, that the cylinder 88 can be connected to a conventional pneumatic system provided on the agricultural implement 10. Piston 90 of the cylinder 88 is normally locked against endwise movement within the cylinder 88 in both directions whereby preventing movement of arm 82 and thereby holding the steering column 40 in a fixed angular position relative to the floor 20.

Figure 10:
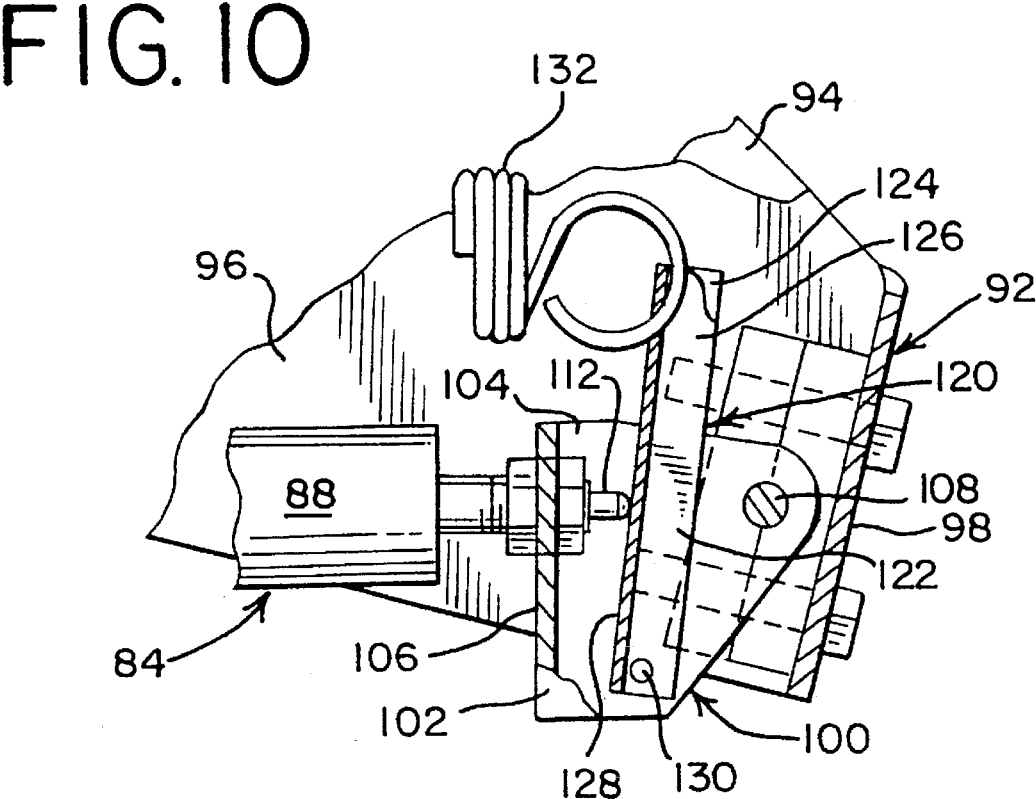
FIG. 10 is a fragmentary side elevational view of structure, partially shown in section, for articulately connecting one end of a gas spring mechanism to the frame of the implement.
Figure 11:
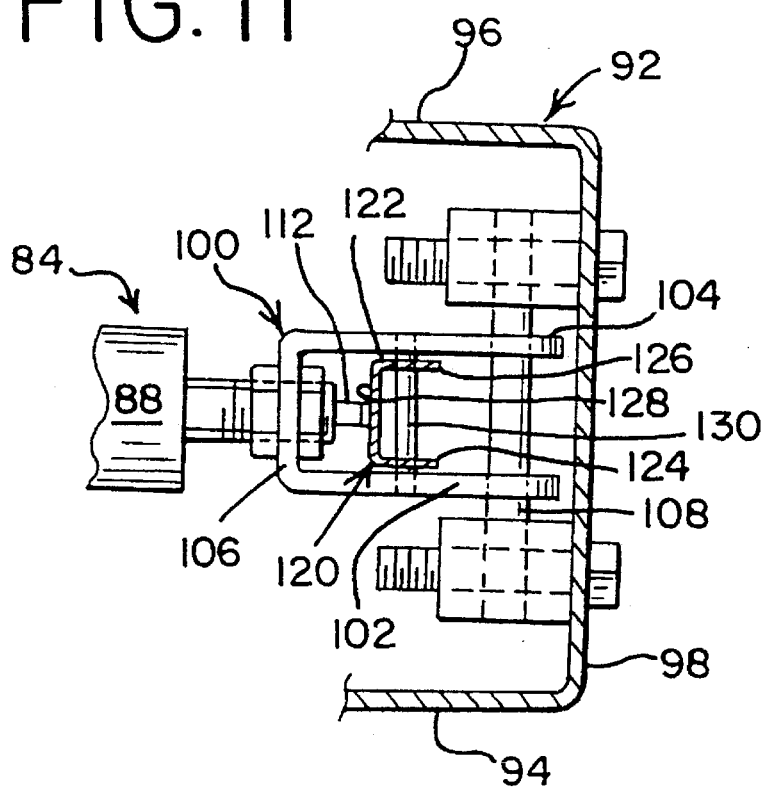
FIG. 11 is a fragmentary top plan view partially in section of the structure illustrated in FIG. 10.

As shown in FIG. 7, the mounting bracket assembly 86 to which the cylinder 88 is articulately connected includes a main preferably U-shaped mounting bracket 92 that depends from and is rigidly connected to the underside of the floor 20. As shown in FIGS. 10 and 11, bracket 92 preferably includes a pair of generally parallel and laterally spaced vertical sidewalls 94 and 96 that are rigidly secured at their upper ends to the underside of the floor 20 (FIG. 7) and define an open space therebetween. The walls 94 and 96 of bracket 92 are joined to each other by a front wall 98.

In a preferred form of the invention, the mounting bracket assembly 86 further includes another preferably U-shaped bracket 100 that is pivotally connected between the walls 94 and 96 of the main bracket 92. As shown, bracket 100 includes pair of generally parallel and laterally spaced vertical sidewalls 102 and 104 that define an open space therebetween. The sidewalls 102, 104 of bracket 100 are rigidly connected to each other by a vertical rear wall 106. A laterally extending pivot shaft 108 is carried by and extends generally parallel to the front wall 98 of the main bracket 92. Shaft 108 is secured to the sidewalls 102 and 104 of the bracket 100 to allow bracket 100 to freely pivot about the axis of shaft 108 and relative to mounting bracket 92. Notably, the rod end of the cylinder 88 passes through and is suitably secured to the vertical rear wall 106 of the bracket 100 thereby securing the end of the cylinder 88 to the main mounting bracket 92 while allowing pivotal movement of the cylinder assembly 88 about the axis of stub shaft 108.

Figure 12:
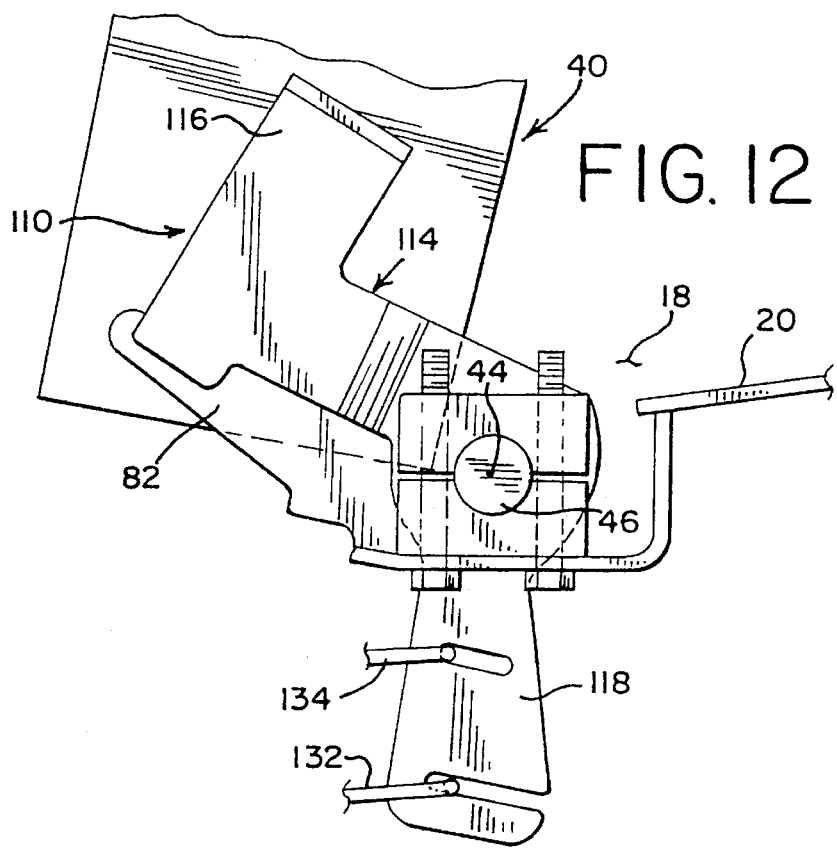
FIG. 12 is a fragmentary side elevational view of component parts of a preferred form of release mechanism used to adjust the angular disposition of a steering column forming part of the steering system of the present invention.

To facilitate adjustment of the steering column 40 toward and away from the front window 26, the tilting mechanism 43 of the present invention further includes a release mechanism 110 (FIG. 12). The release mechanism 110 regulates operation of the gas spring mechanism 84 by controlling the operative length of the cylinder 88 and thereby selectively controlling the tilted position of the steering column 40 preferably while the operator remains seated in the cab region 18 of the implement 10.

As shown in FIGS. 7, 10 and 11, gas spring mechanism 84 includes a release valve actuator 112. In the illustrated embodiment, the release valve actuator 112 linearly extends beyond and is preferably spring biased in an outward direction away from the fixed rod end of cylinder 88. As will be appreciated, rearward movement of the release actuator 112 against the action of the spring allows the piston 90 (FIG. 7) to move endwise within the cylinder 88 thereby permitting angular displacement of the arm 82 and angular movement of the steering column 40 about its pivot axis 44 through a relatively wide range of movement toward and away from the front window 26.

In a preferred form of the invention, and as shown in FIG. 12, the release mechanism 110 includes an operator controlled assembly 114 preferably mounted in the immediate vicinity of the steering column 40. In the illustrated embodiment, the assembly 114 includes a foot pedal 116 to control operation of the gas spring mechanism 84. As will be appreciated, the operator controlled assembly 114 can be operated through devices other than a foot pedal without detracting from the spirit and scope of the present invention. For example, the operator controlled assembly could include a hand controlled actuator arranged along the length of the steering column 40 as part of the release mechanism 110.

As shown in FIG. 12, the foot pedal 116 is mounted for rocking movement about the rockshaft 46 adjacent to the steering column 40. Rocking movement of pedal 116 results in angular movement of an arm or lever 118 that radially extends from the rockshaft 46 in a generally normal relation to the pedal 116 and beneath the floor 20. Notably, arm 118 does not pass from beneath the floor 20 for the full range of movement of the pedal 116. In a preferred form, foot pedal 116 and arm 118 are joined to each other in the region of the rotational axis 44 of steering column 40 and preferably adjacent to that portion of arm 82 extending through the floor 20. Therefore, a common suitable foam seal (not shown) is used to wipe against those areas of the arms 82 and 118 that pass through the floor 20 to inhibit dirt, dust and other debris from passing through the opening into the cab region 18 of the implement.

In the illustrated form of the invention, the release mechanism 110 for controlling operation of the gas spring mechanism 84 further includes an actuator 120 that is responsive to actuation of the operator controlled assembly 114. As shown in FIGS. 10 and 11, the actuator 120 is in the form of a bracket 122 mounted for vertical pivotal movement in the open space defined by walls 102, 104 of bracket 100 between the front wall 98 of the main mounting bracket 92 and the rear wall 106 of bracket 100. Bracket 122 preferably has a generally U-shaped configuration including a pair of generally parallel and vertical sidewalls 124 and 126 that are joined to each other by a rear wall 128 preferably having a vertical dimension which is greater than the vertical dimension of the sidewalls 102, 104 of bracket 100. A laterally extending stub shaft 130 is secured between the sidewalls 102, 104 of bracket 100 and mounts bracket 122 for vertical pivoting movement toward and away from the release valve actuator 112 of the gas spring mechanism 84.

A force transfer assembly 131 (FIG 7) interconnects the foot pedal 116 with the release valve actuator 112 on the gas spring mechanism 84. Returning to FIG. 7, the force transfer assembly 131 includes a coil spring 132 that connects the arm 118 to the upper end of the bracket 122 of actuator 120 thereby resiliently biasing the rear wall 118 of bracket 122 against the free end of the release valve actuator 112 of the gas spring mechanism 84. Notably, a second coil or return spring 134 is arranged between the arm 118 and the main mounting bracket 92. The purpose of the spring 134 is to resiliently bias the pedal 116 to a preset released position. The provision of spring 134 requires the operator to positively act to release the steering column 40 from its locked position.

In a preferred form of the invention, the steering column 40 is further provided with a second tilting mechanism 140 for allowing the steering wheel 42 to be tilted separately relative to the selected tilted position of the steering column 40 thereby advantageously promoting ergonomic positioning of the steering wheel 42 of the implement 10. As shown in FIGS. 3 and 5, tilting mechanism 140 is arranged between the steering column 40 and the steering wheel 42 and defines a second generally horizontal axis 144 (FIG. 13) about which the steering wheel 42 pivots and that extends generally parallel to the pivot axis 44 (FIG. 9).

As shown in FIGS. 5 and 13, the depending legs 50 and 52 of bracket 48 are articulately secured to opposite sides of the steering column 40 by a pin 146. In the illustrated embodiment, pin 146 completely passes through the column 40 and through the legs 50, 52 of the bracket 48. As shown, pin 146 is releasably secured against endwise displacement by snap rings 147, 148 provided toward opposite ends of pin 146. The pin 146 defines the pivot axis 144 about which the steering wheel 42 pivotally moves. Notably, pivot axis 144 of the second tilt mechanism 140 is arranged vertically proximate to the axis 66 of the upper steering joint 58 (FIG. 5).

The second tilting mechanism 140 furthermore includes a manually operated lock 150 for releasably holding the steering wheel 42 in a selected tilted position independent of the tilted position of the steering column 40. Referring to FIGS. 5, 13 and 14, the lock 150 includes a locking plate 152 carried internally of the steering column 40 and generally parallel to leg 52 of bracket 48. One end of plate 152 is connected to the pivot pin 146. The opposite end of plate 152 is provided with an internally threaded bore 154. Lock 150 further includes a locking handle 156 which is readily accessible to the operator and moves through an elongated slot 158 defined in the side wall of the steering column 40 beneath arm 52 of bracket 48. Notably, slot 158 preferably has an arcuate configuration having the pivot axis 144 as the center of the curve and wherein opposite ends of the slot 158 define stops for limiting the extent of tilting movement of the steering wheel 42 relative to the selected position for the steering column 40.

In the illustrated from of the invention, the locking handle 156 has an external handle portion 160 with a threaded shank portion 162 extending therefrom. The locking handle 160 is designed to adjust to any rotational position about the longitudinal axis of the shank portion 162 thereby facilitating operation of the locking handle 156. Shank portion 162 of the locking handle 156 passes through slot 158 and is adapted to be threadably received within the threaded bore 154 on the plate 152. Handle portion 160 of the locking handle 156 has a annular shoulder portion 166 having a diameter greater than that of shank portion 162. As shown in FIG. 5, a washer 164 is preferably provided as to be placed between shoulder portion 160 and by 52 to define an annular clamping surface 168 therebetween. Washer 164 has a diameter that is greater than the width of slot 158.

In a most preferred form of the invention, and as shown in FIGS. 6 and 15, the steering column 40 is preferably comprised of vertically elongated casings 170 and 172 which are telescopically arranged relative to each other. Casing 170 is provided at the lower end of the steering column 40 while casing 172 is provided at the upper end of the steering column 40. Casings 170 and 172 slidably overlap one another along a sufficient portion of each of their lengths. Notably, a relatively close sliding fit is established between the casings 170, 172 whereby the casings 170, 172 provide substantially the same stiffness and rigidity to the steering column 40 as if the steering column were a one-piece structure.

Figure 16:
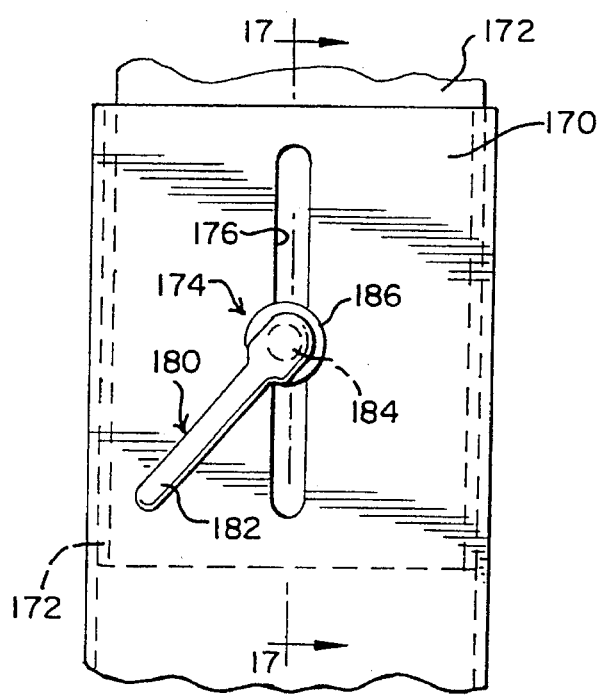
FIG. 16 is a fragmentary elevational view of a preferred form of a mechanism used to adjust the elevation of the steering wheel of the steering system.
Figure 17:
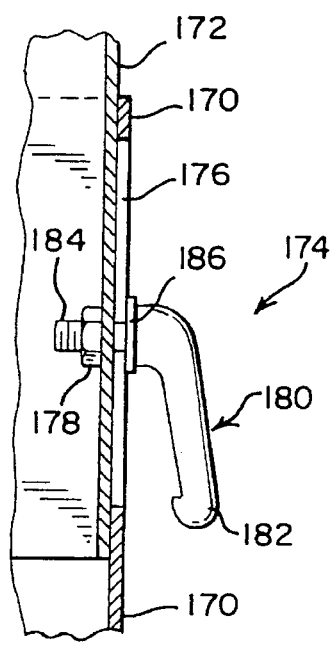
FIG. 17 is a sectional view taken along line 17—17 of FIG. 16.

Turning to FIGS. 16 and 17, a lock mechanism 174 releasably holds the casings 170, 172 in vertically adjusted relation relative to each other so as to allow the steering wheel to be ergonomically positioned relative to the seat 34 (FIG. 2). As shown, the lock mechanism 174 preferably includes a vertically elongated slot 176 defined in one side of casing 170. Notably, the ends of the slot 176 define stops for limiting the vertical displacement of the casings 170, 172 relative to each other. An internally threaded fastener 178 is secured to the interior of casing 172 in alignment with and is normally arranged between opposite ends of the elongated slot 176. The lock mechanism 174 further includes a locking handle 180 that is adapted to cooperate with the fastener 178 in releasably locking the casings 170, 172 in vertically adjusted relation relative to each other.

As shown, the locking handle 180 has an external handle portion 182 with a threaded shank portion 184 extending therefrom. The handle portion 182 is designed to adjust to any rotational position about the longitudinal axis of the shank portion 184 thereby facilitating adjustment of the locking handle 180. The shank portion 184 of handle 180 passes through the slot 176 in casing 170 and is adapted to be threadably received by the fastener 178. The handle portion 182 is further provided with an annular shoulder portion 186 having a diameter greater than the width of slot 176.

In those embodiments of the invention wherein the steering column 40 is vertically adjustable, the steering shaft 56 is preferably configured to accommodate vertical adjustment of the steering column 40 without requiring different parts and/or extensive operator intervention. As shown in FIGS. 6 and 15, the upper coupling 72 of the lower steering joint 60 on the steering shaft 56 has a vertically elongated configuration compared to the lower coupling 74 and is configured to endwise receive the free end of the shaft 56. The upper coupling 72 is provided with an axial bore 186. The axial bore 186 and at least the lower end of shaft 56 are each provided with a cross-sectional configuration permitting endwise or axial movement therebetween while rotation between the shaft 56 and upper coupling 72 is prohibited. In the most preferred form of the invention, the upper coupling 72 has an axial length which is greater than the distance between opposite ends of the elongated slot 176. As such, no adjustments are required to be made to the steering shaft 56 to accommodate vertical adjustment of the steering column 40.

A brief description of the mode of operation of the tiltable steering system of the present invention will be provided to assure a complete understanding of the present invention. An advantageous feature of the present invention relates to the ability of the tiltable steering system 36 to afford the maximum space or room in the cab region 18 of the implement thereby facilitating ingress and egress from the cab region of the implement.

As will be appreciated from the above, the tilting mechanism 43 readily allows the steering column 40 to rotate about pivot axis 44 into a vertical position closely adjacent to the front window 26 to maximize the space within the cab region 18 thereby facilitating ingress into the cab. Once the steering column 40 is tilted into position, the tilting mechanism 43 releasably and yet rigidly holds the steering column 40 in any vertically selected tilted position chosen by the operator. In those embodiments of the invention so equipped, the second tilting mechanism 140 permits angular manipulation of the steering wheel 42 separately from and relative to the selected tilted position of the steering column 40 to thereby further enhance the space provided in the cab region 18 of the implement 10.

Once the operator is seated in seat 34 in the cab region 18, the tiltable steering system 36 of the present invention allows the steering wheel 42 to be ergonomically positioned relative to the operator in the seat 34. That is, once the operator is seated, the steering column 40 can be tilted or pivoted about axis 44 and toward the seat 34 away from the window 26. Notably, the lower steering joint 60 allows the steering shaft 56 to move conjointly with the vertical and pivotal movement of the steering column 40. It is also important to note that the pivot axis 76 for the lower steering joint 60 is vertically arranged proximate to the axis 44 of rotation of the steering column 40 thereby inhibiting binding forces from acting on the steering joint 60 in a manner inhibiting transfer of rotary motion from the steering wheel 42 to the steering drive mechanism 78.

Tilting of the steering column 40 about pivot axis 44 is easily and readily effected as through the release mechanism 110 which controls operation of the gas spring mechanism 84. When a change in the angular orientation of the steering column 40 is to be effected, the operator controlled assembly 114 of mechanism 110 is used to readily release the gas spring mechanism 84 from its locked condition and allow the operative length of the cylinder 88 to be adjusted thereby allowing tilting movement of the steering column 40 about pivot axis 44.

In the illustrated embodiment, the foot pedal 116 is depressed when a change in the orientation of the steering column 40 is to be effected. Depression of the foot pedal 116 results in rearward movement of the arm or lever 118. The rearward movement of the arm or lever 118 translates into rearward pivotal movement of the actuator 120 as through the spring 132 of the force transfer assembly 131 pulling on the bracket 122. Rearward pivotal movement of the bracket 122 causes the rear wall 128 thereof to press against and move the release valve actuator 112 against the action of the resilient spring tending to forcibly urge the actuator 112 outwardly away from the rod end of cylinder 88. Sufficient movement of the bracket 122 will cause the actuator 112 to relieve the pressure acting on the piston 90 whereby allowing the operative length of the cylinder 88 to change and thereby allowing the arm 82 and the steering column 40 connected thereto to move into a desired position.

Having once moved the steering column into a desired angular position, the operator controlled assembly 114 is released. Upon release of the assembly 114, the return spring 134 of the force transfer assembly 131 forcibly returns the foot pedal 116 to its initial position whereat it is ineffective to cause a further change in the operative length of the gas spring mechanism 84. Simultaneously with the release of assembly 114, and since the spring 132 no longer exerts a pulling force thereon, the bracket 122 is returned to its initial position thereby allowing the release valve actuator 112 to return to its initial position thereby locking the arm 82 and thereby the steering column 40 in position by preventing further adjustment of the length of cylinder 88. The cylinder 88 thereafter acts as a rigid link to hold the arm 82 in a set position and thereby fixing the angular position of the steering column 40 in the desired angular position selected by the operator.

In a preferred form of the invention, the second tilting mechanism 140 of the steering system 36 furthermore promotes the ergonomic positioning of the steering system relative to the seat 34 as by allowing the steering wheel 42 to be tilted relative to and independently of the selected tilted position of the steering column 40 and about pivot axis 144. Notably, the steering joint 58 at the upper end of the steering shaft 56 allows the stub shaft 68 depending from the steering wheel 42 to move conjointly with tilting adjustment of the steering wheel 42. It is also important to note that the pivot axis 66 for the upper steering joint 58 is arranged vertically proximate to the axis 144 of the second tilting mechanism 140 thereby inhibiting binding forces from acting on the steering joint 58 in a manner inhibiting or interfering with the transfer of rotary motion from the steering wheel 42 to the steering shaft 56.

To adjust the steering wheel 42 relative to the steering column 40, the manually operated lock 150 is turned or rotated to release the clamping relationship established between the bracket 48 and the steering column 40. That is, when the locking handle 156 is appropriately rotated, the locking plate 152, which is threadably connected to the handle 156, is released from its frictional lock with the interior of the steering column 40. Having once released the locking handle 156, the steering wheel 42 can be angularly moved about axis 144 through a relatively wide range of positions relative to the selected tilted position of the steering column 40. As will be appreciated, opposite ends of the slot 158 define limit stops which engage with the shank portion 162 of the handle 156 thereby preventing the steering wheel 42 from moving beyond the predetermined range of movement set by the slot 158.

Having once adjusted the steering wheel 42 into a desired position, the handle 156 of lock 150 is turned to again frictionally secure or clamp the locking plate 152 against the steering column 40 thereby preventing angular displacement of the steering wheel 42 relative to the adjusted or tilted position of the steering column 40.

As will be appreciated, as the handle 156 turns, the threaded portion 162 controls the clamping relationship of the locking plate 152 relative to the interior of the steering column 40. When the locking handle 156 is rotated to secure the bracket 48 against the steering column 40, the locking plate 152 is drawn toward the steering column 40 and the shoulder portion 166 on the handle 156 draws the arm 52 of bracket 48 against a corresponding outer side of the steering column 40. The handle 156 is rotated until the steering column 40 is clamped between the locking plate 152 and the shoulder portion 166 on the handle 156 thereby preventing further movement of the bracket 48 and the steering wheel 42 relative to the steering column 40.

Ergonomic positioning of the steering wheel 42 relative to the seat 34 is further promoted by the telescoping relationship of the steering column casings 170, 172 and the locking mechanism 174 which releasably maintains the casings 170, 172 in a vertically adjusted disposition relative to each other. The locking mechanism 174 operates under the influence of the manually actuated locking handle 180 that is readily accessible to the operator. Upon release of the locking handle 180, the casings 170, 172 can telescopically move relative to each other to either shorten the steering column thereby providing additional space in the cab region 18 to enhance the ingress and egress from the cab 18 or lengthen the vertical dimension of the steering column 40 so as to position the steering wheel 42 closely adjacent to the seat 34. Accordingly, the steering wheel 42 can be closely positioned toward the operator so that no component of the steering system 36, including the steering wheel 42 and the steering column 40 will be in the operator's line of sight out of the entire height of the window. Notably, the elongated configuration of the upper coupling piece 72 of the lower steering joint 60 allows a corresponding change in the length of the steering shaft 56 in response to adjustment of the casings 170, 172 relative to each other without requiting any special tools and without any adverse effect on steering control.

In the preferred embodiment, the threaded shank portion 184 of the handle 180 passes through the vertically elongated slot 176 defined in casing 170 and threadably engages with the fastener 178 secured to casing 172. As will be appreciated, opposite ends of the slot 176 define limit stops which are adapted to engage with the threaded shank portion 184 of the locking handle 180 thereby limiting the vertical telescoping movements of the steering column 40 to within predetermined limits set by the vertical dimension of slot 176.

After adjusting the vertical dimension of the steering column 40, the locking handle 180 is operated to again frictionally secure the casings 170, 172 relative to each other in their vertically adjusted relationship. On the other hand, the handle 180 is turned until the annular shoulder portion 186 thereof and the threaded fastener 178 cooperate to clamp the casings 170, 172 against each other in a manner inhibiting movements therebetween.

The steering system 36 of the present invention provides the operator with an extensive range of movements for the steering wheel 42 relative to the operator seat 34. It should be noted that any order of movement within the range can be effected between the steering wheel 42 and the steering column 40. That is, after being seated the operator can readily adjust the position of the steering column 40 such that no component of the steering system including the steering wheel would be in the operator's line of sight all the way down to the bottom of the window 26 thereby enhancing operator visibility out of the full height of the window 26 and thus improving visual access to the ancillary mechanisms disposed beneath the window 26. With the present invention, the operator merely needs to operate the release mechanism 110 which is conveniently located relative to the steering column 40 thereby relieving the pressure acting on the gas spring mechanism 84 to effect a change in the position of the steering column 40 and the steering wheel 42. Upon activation of the release mechanism 110, the operator can readily move the steering column 40. If so desired, the second tilting mechanism 140 allows the steering wheel 42 to be independently moved relative to the steering column 40 to further enhance visibility through the front window 26. The ability to telescopically adjust the vertical dimension of the steering column 40, furthermore enhances the limited space constraints within the cab region 18 of the implement 10.

From the foregoing, it will be observed that numerous modifications and variations can be effected without departing from the true spirit and scope of the novel concept of the present invention. It will be appreciated that the present disclosure is intended as an exemplification of the invention, and is not intended to limit the invention to the specific embodiment illustrated. The disclosure is intended to cover by the appended claims all such modifications as fall within the scope of the claims.

What is claimed is:

1. A tilting steering system for an off-highway implement comprising:

an operator station defined by a floor;

a steering column extending above said floor and having a generally horizontal pivot axis about which said steering column pivots to an infinite number of generally vertical tilt positions, said steering column having a steering wheel arranged toward an upper end thereof; and a locking mechanism positioned substantially underneath the floor of the operator station and operably associated with said steering column for locking said steering column in said infinite number of tilt positions;

said locking mechanism including a pivot arm operably connected to the steering column and extending beneath said floor.

2. The tilting steering system according to claim 1 wherein said pivot arm extends generally radially from said steering column pivot axis.

3. The tilting steering system according to claim 1 wherein said pivot arm and steering column are mounted to a pivot rod defining said pivot axis.

4. The tilting steering system according to claim 3 wherein said pivot arm extends tangentially from said pivot rod.

5. The tilting steering system according to claim 3 further comprising a steering wheel shaft extending longitudinally within the steering column, said shaft being rotatable while allowing said steering column to remain stationary, and said pivot rod being offset from the axis of said steering wheel shaft.

6. The tilting steering system according to claim 1 wherein the tilting mechanism includes a gas spring mechanism attached to the pivot arm for releasably holding the steering column in said tilt positions.

7. The tilting steering system according to claim 6 further comprising an actuating mechanism for operating said gas spring mechanism thereby allowing the steering column to be vertically moved between said tilt positions.

8. The tilting steering system according to claim 7 wherein said gas spring mechanism includes a gas spring having a release valve which is responsive to operation of the actuating mechanism, and the actuating mechanism includes a spring biased member movable between active and inactive positions for controlling operation of the gas spring mechanism.

9. The tilting steering system according to claim 8 further comprising a foot pedal positioned above the floor of the operator station, said foot pedal adapted to move said spring biased member.

10. A tilting steering system for an off-highway implement including an operator station defined by a floor, said steering mechanism comprising:

a steering column extending above said floor and adapted to pivot to a plurality of generally vertical tilt positions about a generally horizontal pivot rod, said pivot rod being offset from a longitudinal centerline of the steering column, and said steering column having a steering wheel arranged toward an upper end thereof;

a locking mechanism including a pivot arm extending generally radially from the pivot rod and beneath said floor, a gas spring mechanism positioned beneath said floor and attached to the pivot arm for releasably holding the steering column in said selected tilted position, and a spring biased actuating mechanism for operating said gas spring mechanism thereby allowing the steering column to be vertically moved to a selected tilt position; and an actuator having an upper portion extending above said floor and a lower portion extending below said floor for operably engaging said actuating mechanism.

11. A triple articulated steering system for an off highway implement having an enclosed compartment including a front window and a floor, said steering system comprising:

a steering column extending upwardly from the floor of the compartment and defining a generally horizontal first pivot axis about which said steering column is vertically tiltable to a selectable vertical steering column position, said steering column including a lower sleeve and an upper sleeve telescopingly received relative to each other and movable to a selectable steering column elevational position;

a steering wheel arranged toward an upper end of the steering column, said steering wheel adapted to pivot about a second pivot axis extending generally parallel to the first pivot axis into a selectable steering wheel tilted position relative to the steering column; and said steering wheel tilted position, steering column tilted position, and steering column elevational position being independently adjustable, whereby two of said positions remain locked while the third of said positions is adjusted to a desired selectable position.

12. The steering system according to claim 11 further comprising a steering column elevational locking mechanism for releasably securing the sleeves in telescoping relation relative to each other thereby allowing the steering wheel to be elevationally positioned through a range of vertical positions.

13. The steering system according to claim 11 further comprising a steering wheel tilt locking mechanism for releasably securing said steering wheel relative to said steering column.

14. The steering system according to claim 11 further comprising a steering column tilt locking mechanism for releasably holding said steering column in a selectable vertical steering column tilted position relative to said front window.

15. The steering system according to claim 14 wherein the tilt locking mechanism is responsive to a release mechanism for allowing said steering column to be selectively moved about said first pivot axis toward and away from said window.

16. The steering system according to claim 15 wherein said steering column tilt locking mechanism includes an arm radially extending from the steering column and a gas spring mechanism connected toward a distal end of said arm for holding said steering column in said selected tilted position relative to said front window.

17. The steering system according to claim 16 wherein said gas spring mechanism includes a gas cylinder one end of which is articulately connected to said arm and an opposite end of which is articulately connected to said implement, and whereby the operative length of said gas cylinder controls the angular orientation of said steering column about said first pivot.

18. The steering system according to claim 17 wherein said gas spring mechanism further includes a release mechanism for selectively allowing the operative length of said cylinder to be changed from inside the compartment of the implement.

19. The steering system according to claim 18 wherein said release mechanism includes an operator controlled actuator connected to a relief valve arranged in combination with the gas cylinder.

20. A steering system for an off highway implement comprising:

a steering column extending upwardly from the floor of the compartment and defining a generally horizontal first pivot axis about which said steering column is vertically tiltable to a selectable vertical steering column position;

a first locking mechanism for releasably holding the steering column in an adjusted vertical tilt position;

a steering wheel arranged toward an upper end of the steering column, said steering wheel adapted to pivot about a second pivot axis extending generally parallel to the first pivot axis into a selectable steering wheel tilted position relative to the steering column; and a second locking mechanism for releasably holding the steering wheel in an adjusted tilted position relative to the steering column, said second locking mechanism being operable independently of said first locking mechanism to thereby allow independent adjustment of said steering column vertical tilted position and said steering wheel tilted position.

21. The steering system according to claim 20 wherein said steering column further comprises a lower sleeve and an upper sleeve telescopingly received relative to each other and movable to a selectable steering column elevational position.

22. The steering system according to claim 21 further comprising a third locking mechanism for releasably securing the sleeves in telescoping relation relative to each other thereby allowing the steering wheel to be elevationally positioned through a range of vertical positions, said third locking mechanism being operable independently of said first and second locking mechanisms.

23. The steering system according to claim 20 wherein said first locking mechanism comprises a gas spring operably associated with the steering column for releasably holding the steering column in a selected tilted position about said first pivot axis.

* * * * *